(No Model.) 8 Sheets—Sheet 1.
W. T. WATERS.
ELECTRIC RAILWAY SIGNAL.

No. 314,762. Patented Mar. 31, 1885.

WITNESSES
Wm A. Skinkle
H. W. Elmore

INVENTOR
William T. Waters,
By his Attorney
Frankland Jannus (No Model.)
8 Sheets—Sheet 2.

W. T. WATERS.
ELECTRIC RAILWAY SIGNAL.

No. 314,762. Patented Mar. 31, 1885.

Fig. 3.

WITNESSES
Wm A. Skinkle
H. W. Elmore

INVENTOR
William T. Waters.
By his Attorneys.
Frankland Jannus (No Model.)

W. T. WATERS.
ELECTRIC RAILWAY SIGNAL.

No. 314,762. Patented Mar. 31, 1885.

WITNESSES
Wm A. Skinkle
H. W. Elmore

INVENTOR
William T. Waters.
By his Attorney
Frankland James (No Model.)

W. T. WATERS.
ELECTRIC RAILWAY SIGNAL.

No. 314,762.   Patented Mar. 31, 1885.

WITNESSES
Wm A. Skinkle
H. W. Elmore

INVENTOR
William T. Waters.
By his Attorneys,
Frankland James (No Model.)  8 Sheets—Sheet 5.

W. T. WATERS.
ELECTRIC RAILWAY SIGNAL.

No. 314,762.  Patented Mar. 31, 1885.

WITNESSES
Wm A. Skinkle
H. W. Elmore

INVENTOR
William T. Waters
By his Attorney
Frankland Jannus

(No Model.)  8 Sheets—Sheet 6.

W. T. WATERS.
ELECTRIC RAILWAY SIGNAL.

No. 314,762.  Patented Mar. 31, 1885.

WITNESSES
Wm A. Skinkle
H. W. Elmore.

INVENTOR
William T. Waters.
By his Attorney
Frankland James.

(No Model.)

W. T. WATERS.
ELECTRIC RAILWAY SIGNAL.

No. 314,762. Patented Mar. 31, 1885.

WITNESSES
Wm A. Skinkle
H. W. Elmore

INVENTOR
William T. Waters.
By his Attorney
Frankland Jannus

UNITED STATES PATENT OFFICE.

WILLIAM T. WATERS, OF ATLANTA, GEORGIA.

ELECTRIC RAILWAY-SIGNAL.

SPECIFICATION forming part of Letters Patent No. 314,762, dated March 31, 1885.

Application filed February 18, 1884. (No model.)

*To all whom it may concern:*

Be it known that I, WILLIAM T. WATERS, a citizen of the United States, residing at Atlanta, in the county of Fulton and State of Georgia, have invented certain new and useful Improvements in Electric Railway-Signals, of which the following is a specification, reference being had therein to the accompanying drawings.

My invention relates to improvements in the method of employing electro-mechanical devices for exposing and concealing a system of visual signals applicable to both day and night use along a line of railway, and also to the various details of construction incident thereto.

It consists in a series of signaling stations or posts dividing the entire road into blocks, and each post is provided with two distinct sets of signals, one consisting of semaphores for each direction, also provided with illuminated night-signals to be operated in connection therewith, and the second a verifying-signal, visible both day and night, operated from either direction, and acting as a signal whenever seen. The first-mentioned set consists of four semaphore arms or disks mounted on rods pivoted within the signal box or station, so that they will swing outward into view. The four disks are divided into two sets, each comprising an advance and a rear signal, and the sets are, for convenience, located in separate compartments on opposite sides of the transverse axis of boxes or houses mounted upon posts or towers at suitable intervals along the roadway. These intervals may vary from one to several miles, in order that the signals may be placed at points most favorable for observation. The night-signals consist of a light or lights in a fixed position and a set of disks controlled by the movements of the day-signals, and thereby made to expose or change the color of said fixed light. The verifying-signal is a revolving disk by day and a light by night, and the main feature of this portion of the system is, that by means thereof and the electrical connections hereinafter explained an engineer is notified before leaving one block whether his advance signal has or has not been displayed at the opposite end of the block he is about to enter.

In the drawings.

Similar letters of reference denote like parts in the several figures.

Figure 7:
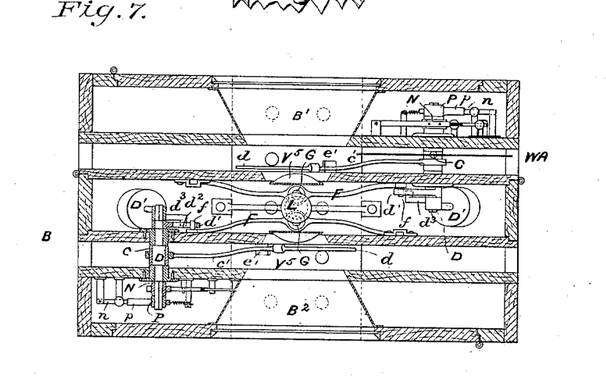
Fig. 7 is a plan view of the lower portion of the signal-box on the line 7 7 of Fig. 3.
Figure 8:
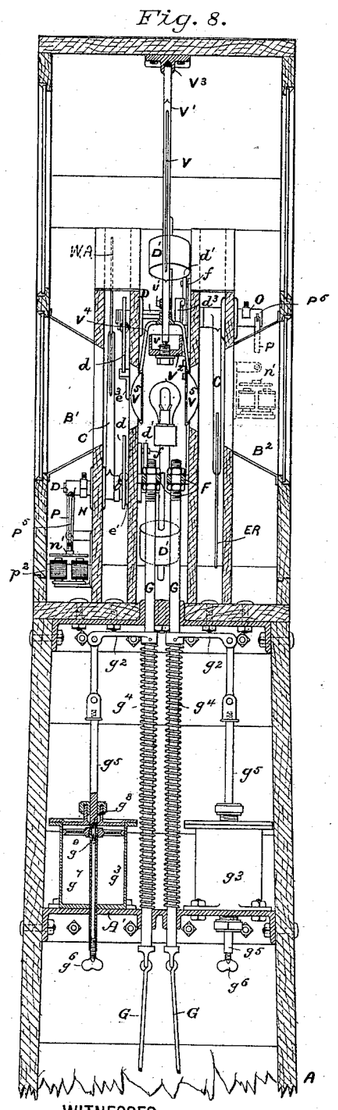
Fig. 8 is a transverse sectional elevation of a signal-box and the mechanically-operated setting and housing apparatus.
Figure 9:
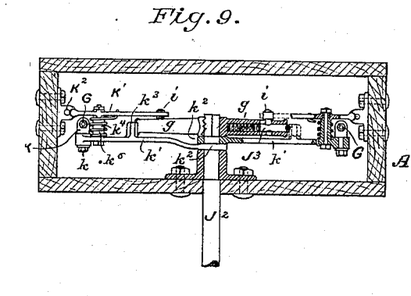
Fig. 9 is a plan view, partly in section, of the spring-catches for connecting and disconnecting the power-receiver from the remainder of the mechanical signal-operating devices.
Figure 10:
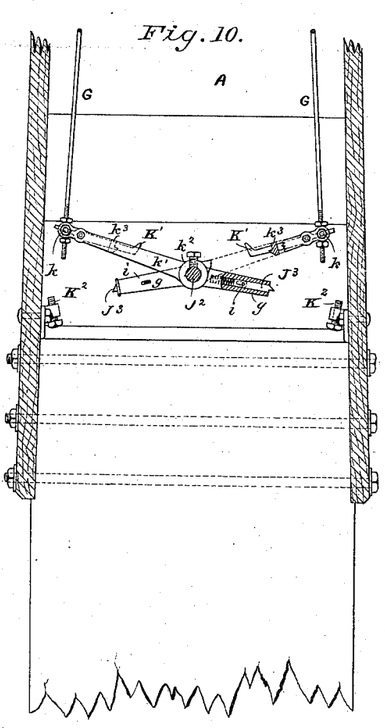
Fig. 10 is a transverse sectional elevation of the lower portion of one of the posts, showing the spring-catches and their tripping mechanism.
Figure 11:
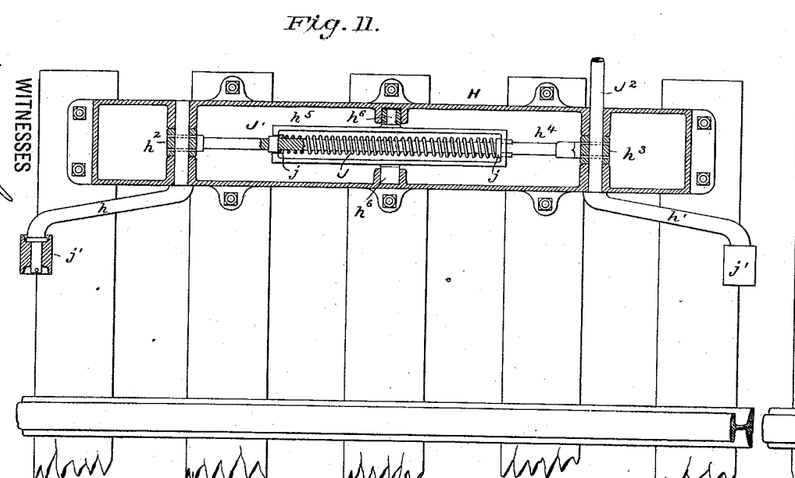
Fig. 11 is a plan view of a section of track and of the device used to receive power from the passing train and to afterward gradually transmit the same to the mechanical signal-controlling apparatus.
Figure 12:
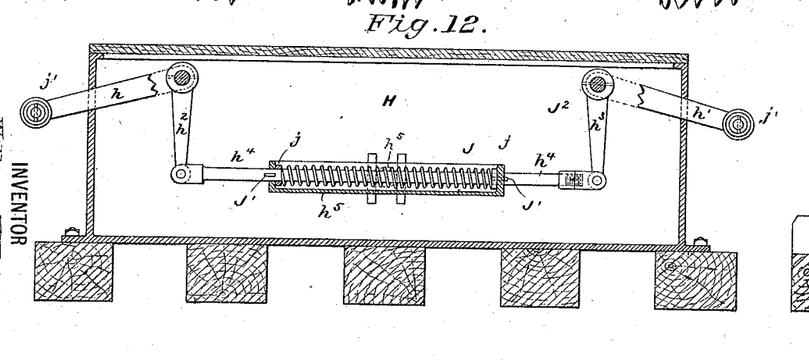
Fig. 12 is a sectional elevation of the same.
Figure 13:
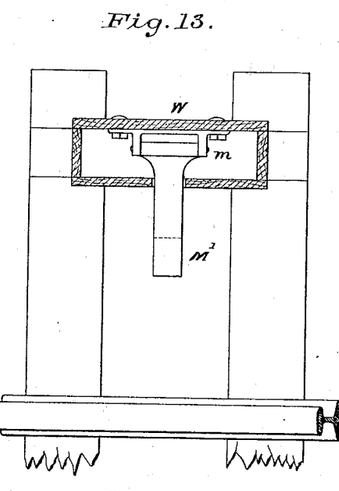
Fig. 13 is a plan view of the stationary electric contact-arm and a partial section of track.
Figure 14:
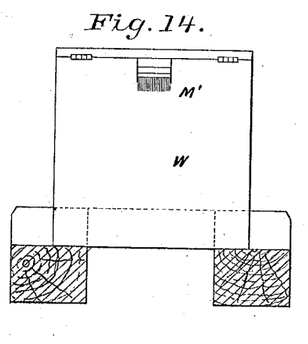
Fig. 14 is an elevation of same as seen from the track.

A represents a post or tower, which may be located at any point adjacent to the railway that is most favorable for observation; and it is surmounted by a housing or box, B, within which the moved signals and operating mechanism are sheltered from the elements and from view when not in actual use. The post A is of any suitable material, is made hollow, and is usually about thirteen feet in height, and it contains the rods connecting the signals with the power-receiver, a pair of air-cushion cylinders and retracting-springs, and the spring clutching and tripping mechanism, by means of which the various devices are operated. The box B is of any suitable material, is preferably rectangular in shape, and divided longitudinally into five compartments. The outer compartments contain reflectors B' B² and the electric locking and switching devices. The intermediate ones contain the swinging advance and rear signals, and the center one contains the apparatus for mechanically setting and housing the signals, their counter-weights, an electric lamp, and a vertically-pivoted verifying-signal provided with extensions carrying disks for changing the color, and thereby affecting the signification, of the illuminated night-signal. The advance and rear signals of each set are lettered W A, W R and E A, E R, respectively, and are displayed from opposite sides of the box from either direction. The said signals consist of disks mounted upon rods C, which are supported upon collars $c$ upon the shafts D, which shafts, besides carrying the semaphores, are also provided with arms $c'$, at the ends of which are the colored disks $d$, for night use. The advance signals are pivoted in the lower part of the box, and when housed are in position to swing outward into view the moment their retarding mechanism is released. The rear signals are pivoted in the upper part of the box in position when housed to remain so until forcibly swung outward, and when in the latter position to house themselves when released.

The mechanical means for housing the advance and displaying the rear signals are as follows: The shafts D, which enter the intermediate compartments, are each provided with a loosely-attached crank-arm, $d'$, the outer ends of which are slotted at $d^2$. The said shafts are preferably arranged in the form of a rectangle, within which moves a three-sided frame or yoke, F, that is provided with two pins, $f$, fitting slots $d^2$ in the crank-arms. The draft-rods G G of one set of signals are secured to the lower side of the yokes F, and extend downward through the post until they meet the draft-rod levers $k'$, which are mounted upon a horizontal shaft, $J^2$, leading from the power-receiver. The power necessary to operate the signals will vary with the condition of the elements. For instance, a strong wind blowing directly against one of the disks will by materially increasing the friction of the parts and bearings necessitate the application of greater power to move said signals. Therefore under ordinary conditions the transfer of the power stored by a moving train from the power-receiver to the signals is likely to be accompanied by considerable strain to the apparatus without the intervention of translating devices. To meet this want I provide each of the draft-rods with a fixed arm, $g^2$, that is connected directly with the piston-rod $g^5$ of an air-cushion cylinder, $g^3$. Between the said arm $g^2$ and the frame A', upon which the air-cylinders rest, I place upon the rods G G the retracting-springs $g^4$. These springs operate to return the parts to their original position when released from the power movement. The piston-rods $g^5$ of the air-cylinders are continued down through the cylinders, and are made tubular up to and a short distance from the pistons. They are also provided at their lower ends with thumb-screws $g^6$ and a rod, $g^7$, extending upward into the hollow portion of the piston-rod. Above the pistons are a number of apertures, $g^8$, leading from the cylinder into the interior of the rod $g^5$, and below the piston is an elongated opening, $g^9$, which, when fully open, together with the apertures above the piston, will allow the air to pass from one side thereof to the other with great rapidity. When, however, the rod $g^7$ is forced upward by its adjusting-screw, so as to close more or less of the slit $g^9$, the resistance to rapid movement of the piston can be increased or diminished, as desired, without practically lessening the amount of power available. As the advance signals move outward independent of the mechanical devices, their crank-arms must be in such position when the signals are housed that they are free to drop outward into view when released. This is effected by placing a second and rigidly-attached crank-arm, $d^3$, on each shaft D in such position that the downward movement of the yoke will only affect the advance signal to swing it into the box and the rear signal to swing it out, both motions being simultaneous. Each of the shafts D is also provided with a counter-weight, D', that is fixed on the side opposite to the signal-carrying rod C, but at a slight outward angle therefrom, so that in the case of the advance signals the weight will insure their starting when released, and then check their fall, and with the rear signals they will hold them in a housed position, assist in raising them into view, and then check their fall when released for the purpose of housing themselves. The power-receiver consists of an oblong box, H, located near the track. The bent levers $h$ $h'$ are suitably journaled within said box, and are there provided with rigidly-attached crank-arms $h^2$ $h^3$, which are connected transversely by a rod, $h^4$. A trough or box, $h^5$, provided with trunnions or lugs $h^6$, incloses a spiral spring, J, through which and the ends of the box $h^5$ passes the rod $h^4$. The box $h^5$ is slitted as well as apertured at each end, and the rod $h^4$ is provided with keys or projections J' J', that will pass through said slits.

Between the keys J', and resting against them, are two washers or rings, $j$ $j$, between which the spiral spring J is confined, so that in whichever direction the rod $h^4$ is moved the spring J will be compressed against the washer resting against the then forward end of the box $h^5$. The bent levers $h$ $h'$ are provided at their outer ends with friction-rollers $j'$ $j'$, and the lever $h'$ is connected to the shaft $J^2$, which extends from the box H, and is secured to the spring-clutches $g$ in the lower end of the post A, which shaft will be turned one way or the other by the spring J, according to the direction of its compression.

Figure 1:
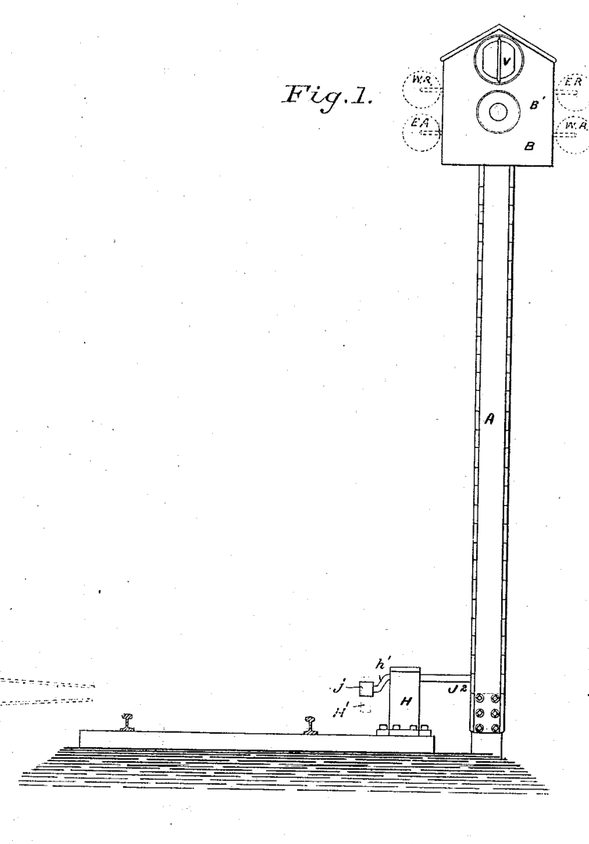
Figure 1 represents a transverse section of a railroad-track and an elevation of one of the signal-posts, together with that portion of its mechanism exposed to actual contact with the passing train.
Figure 2:
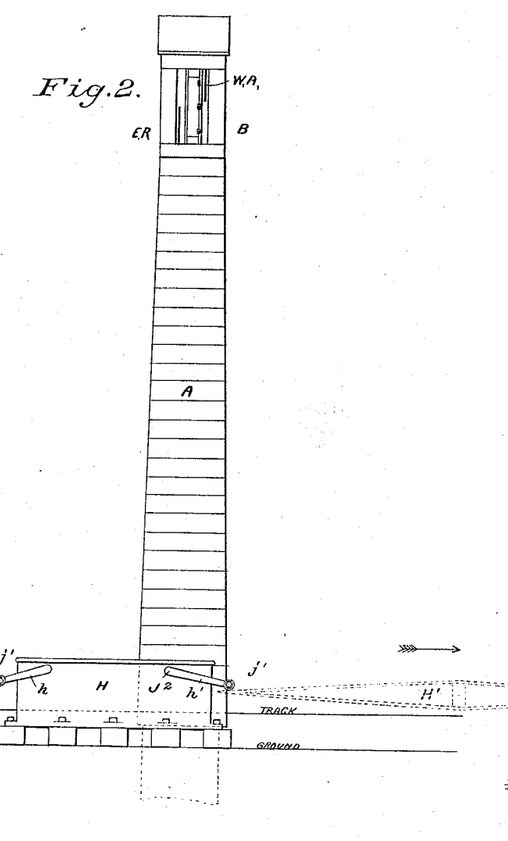
Fig. 2 is a side elevation of a section of track, showing one of the posts and its mechanical contact devices, and also, in dotted lines, the relative construction and position of the contact device carried by each train.
Figure 3:
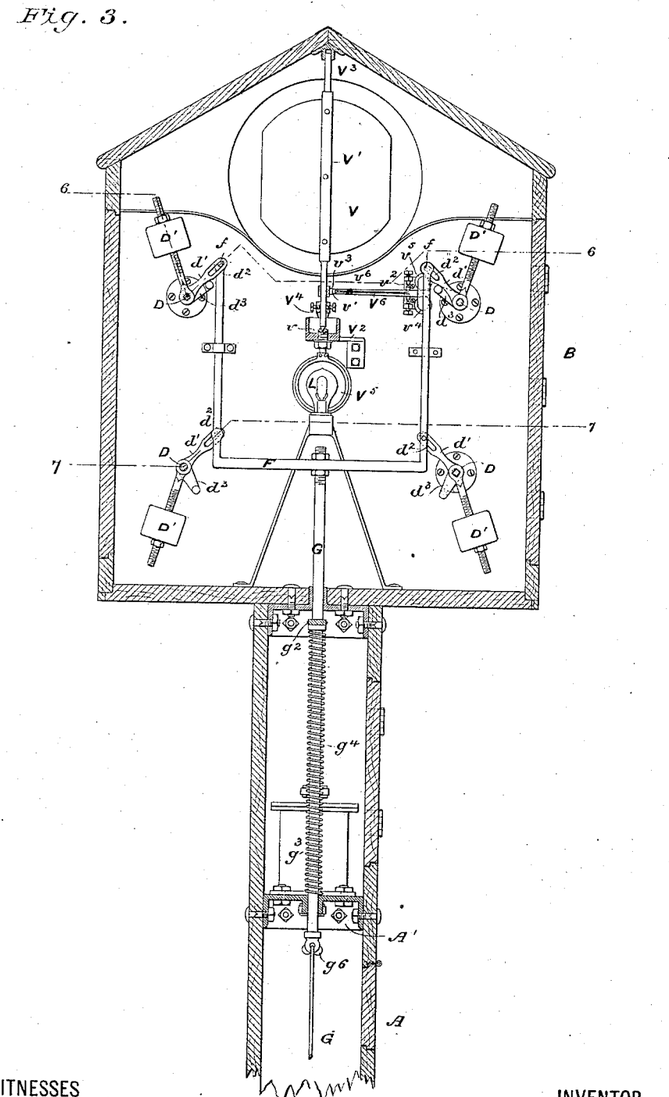
Fig. 3 is a sectional elevation of a signal-post, taken on the line 3 3 of Fig. 6, showing the counter-weights and part of the mechanically-operated setting and housing apparatus.
Figure 4:
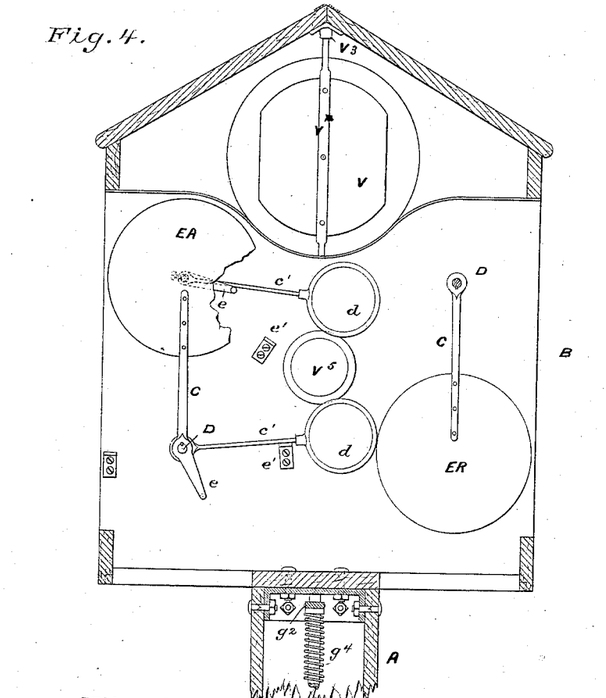
Fig. 4 is a vertical section of the signal-box, taken on the line 4 4 of Fig. 6, and it shows the housed position of one entire set of signals.

In Fig. 2 the shuttle-cam H' is shown rigidly attached to one of the trucks of the train. It is composed of four metallic inclined planes expanding toward and united at the center of their length, where they are also united to their support, which is at such a height from the track as that the cam will pass with certainty and safety above the nearest friction-roller. As it passes thereover, said roller and its lever are depressed and the opposite ones raised, and as the cam advances the end that went over the first roller passes under the second one, still further elevating it, and in that manner using all the power transmitted to compress the spring J in one direction, which operation, being reversible, is in accordance with the direction of the passing train.

The spring-catches $g$ $g$ consist, preferably, of a single casting in the form of a pair of tubular arms rigidly attached at right angles to the end of the shaft $J^2$, and they each have a latch-bolt, $J^3$, extending from their outer ends, which bolts are projected by a spiral spring placed below them in the tubular arms. The bolts $J^3$ are each provided with a stop, $i$, which extends a short distance through slots in the sides of the arms $g$.

Upon the lower ends of the draft-rods G G are placed adjustable collars K, each of which is provided with a stud, $k$, projecting at right angles thereto, and upon each stud is pivoted a lever, $k'$, that extends from the draft-rod to and is supported loosely upon the shaft $J^2$, its inner end being expanded into the collar $k^2$ for that purpose. The levers $k'$ are each provided with a catch, $k^3$, that engages the latch-bolt of its spring-catch arm $g$ and effectually unites the two until the latch-bolt is withdrawn. The levers $k'$ are each further provided with a stud, $k^4$, placed at right angles thereto near their upper ends. Upon these studs are pivoted the tripping-levers K' K', which extend outward beyond the rods G, so as to strike the adjustable stops $K^2$, attached to the frame of the post, when the limit of the downward movement of the draft-rod is reached. The inner ends of the trip-levers are turned up so as to rest upon the stops $i$ at an oblique angle, and when forcibly depressed by striking the stops $K^2$ they release the catch-arm $g$ by pushing the bolt $J^3$ off the catch $k^3$. A spring, $k^5$, is wound on the studs $k^4$ and attached to each trip-lever, for the purpose of holding both of them up out of the way of the stops $i$ until called into action.

From the foregoing it will be readily understood that the passing train stores power in the spring J, and at the same time turns the shaft $J^2$ and the spring-catches $g$ $g$ until one or the other of them engages its draft-rod G, then that the force of said spring is exerted through the yoke F, the stationary and loose crank-arms $d'$ $d^3$, shafts D, and counter-weights, and pulls the advance signals back into the box, and at the same time raises and displays the rear signal, which is retained in its displayed position by means of the spring-catch $n'$ and locking-lever P, and the apparatus by which it was set is restored to its normal position. The verifying-signal V is placed in the upper part of the central compartment of the box B, and it is visible from each direction through a window on each side of the box. The signal consists of a flat disk of any desired shape, size, or material, mounted upon a rod, V', that is pivotally supported upon an adjustable bearing-screw, $v$, passing through a metal frame, $V^2$, extending obliquely across and secured to the inner sides of the central compartment. The upper end of the rod V' is held in a suitable bearing, $V^3$. Attached to the rod V', and depending therefrom, is the two-armed metal frame $V^4$, at the extremity of each portion of which is secured a disk of colored glass, $V^5$, which, for the sake of convenience, may be called "red."

Near the lower end of the rod V' is secured the toothed sector $v'$, and to the side of the compartment is secured a bracket, $v^2$, to which is pivoted a lever, $V^6$, provided at its end with a short segmental rack, $v^3$, meshing with the sector $v'$. The lever $V^6$ is continued rearward beyond its fulcrum, and is provided at its end with a piece of iron, $v^4$, that forms the armature for an electro-magnet, $v^5$, attached to the side of the compartment in any convenient manner, and by means of which the signal V is turned at right angles to the compartment and edgewise to the windows.

Near the front end of the lever $V^6$ is placed an adjustable spring, $v^6$, for the purpose of mechanically restoring the signal to its normal position when the electric circuit is broken, which, as will be hereinafter fully explained, is effected by the housing of either of the advance signals that had been previously displayed.

In the center of each system of signals, and at about the center of the middle compartment of each box B, is located an electric lighting device, L, preferably an incandescent lamp. The shafts D connected with the advance signals each extend from the central compartment through an intermediate and into another one, as seen in Fig. 7. The semaphores W A and E A are attached rigidly to said shafts, as described, and in addition thereto I provide smaller semaphores of colored glass, that by the movement of the apparatus are thrown in front of the central light to produce the necessary advance night-signals.

Figure 6:
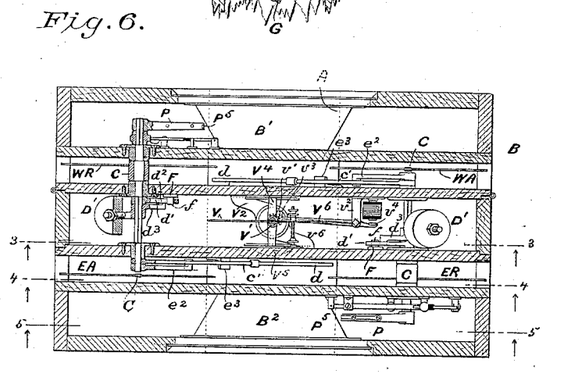
Fig. 6 is a plan view of the upper portion of the signal-box, partly in section on the line 6 6 of Fig. 3.

Upon the shafts D are loosely secured the rods $c'$, which are provided at their extremities with glass disks $d$, preferably red, for the advance signals. Upon the same shafts are rigidly secured crank-arms $e$ $e$, having inwardly-projecting ends, and to the walls of the compartment are secured the stops $e'$ $e'$. When the advance signals are housed, the rods $c'$ are supported upon the stops $e'$, and the disks $d$ are below the light L. The crank-arms $e$ are placed at such an angle that as the signals are allowed to drop out, and when that movement is almost completed, they will come in contact with the rods $c'$, lifting them and the disks $d$, so that they completely cover the light L, and thereby change its color, as seen by a train approaching from a direction opposite to that of the one which set the signal. Those of the shafts D that support the rear signals extend from one outer compartment through the box to the opposite intermediate one, as seen in Fig. 6, and the semaphores W R and E R are rigidly attached thereto, in addition to which I provide smaller semaphores of colored glass, that by the movements of the apparatus are thrown behind the central light to produce the necessary night rear signals. Upon said shafts D are loosely secured the rods $c'$, which carry the glass disks $d$, preferably green, for the rear signals. Upon the same shafts are rigidly secured crank-arms $e^2$ $e^2$, having inwardly-projecting ends. When the said rear signals are housed, the rods $c'$ rest upon the inwardly-extending ends of the arms $e^2$, which are mounted upon their shafts at such an angle that the disks are thereby held above the light L. When the rear signal is set by the passing train, the green disk moves downward until it rests upon a stop, $e^3$, so placed that said disk will then completely cover and thereby change the color of the light L. By placing the colored rear night-signal in the opposite intermediate compartment it is dropped in the rear of the light with respect to the train by which it was set, and thus becomes visible to a following train.

Figure 18:
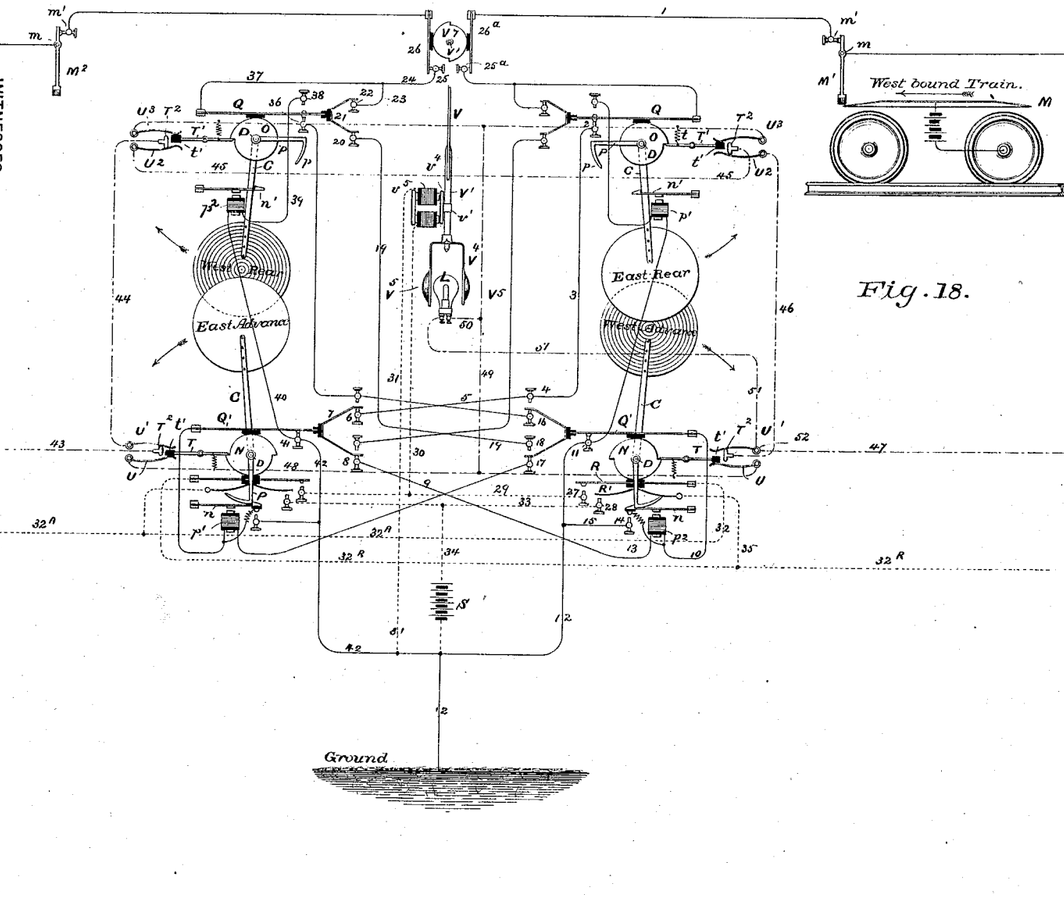
Fig. 18 is a theoretical diagram of the electrical connections.

The diagram, Fig. 18, shows the electrical relationship between the two systems of signals, east and west, that are carried upon each post, together with a train just leaving the home station and about to make contact with the first point in the system, and the method of operating the same is as follows:

I prefer to display advance signals two posts ahead of a train, and in order to effect this each system is provided with pivoted switches, that serve in their normal position to carry the current to fixed electro-magnets, which, when energized, release the signal-locking mechanism, by the display movement of which they are then moved from one set of contacts to another, and in their second position complete another set of circuits, which cut out the opposing signals on the same post, and at the same time unite the contiguous circuits and complete the line to the post next in advance, which, like the rest of the series, is always grounded when no signals are set.

It will be evident that by making more than one contact at any one post I can drop as many signals in advance as may be desired, as each impulse will drop a signal and transfer the ground connection to the next post.

The movable switches above referred to also control two sets of spring-switches, by which the verifying-signal is manipulated. The movements thereof are as follows: An advance signal dropped two posts in front of a train by its movement breaks the local ground-line and connects the post with the one next in advance ready to carry an electrical impulse from the moving train to drop the next advance signal when the train reaches the post then in front of it. This, by closing two verifying-circuits, first sends the current of the local battery rearward to the next nearest post and moves that to "safety," so that an approaching train will know that its advance signal is set, and at the same time by closing the second circuit it puts the advance post in condition to have its verifying-signal turned to "safety" as soon as it in turn becomes, instead of a front, an intermediate post by the setting of the advance signal at the post next in advance. The effect of cutting out one system of signals by setting the other is to make it impossible for a train approaching in the opposite direction to set its signals far enough in advance to leave room for accident, and to provide against any contingency I attach a circuit-breaker to the shaft of the verifying-signal, so that when it is set at "safety" it will break the main line from both directions and prevent the transmission of false signals, which, by making it impossible to receive any verification of its advance, will stop a train approaching from the opposite direction one block away from the train having the right of way. The displaying of a rear signal breaks the circuit of its post rearward, and thereby prevents a following train from affecting either the verifying or advance signals beyond.

In order to allow a train passing a post in which the continuity of the main line is broken by the circuit-breaker operated by the verification-signal to send a current forward to the second post in advance, a contact is provided in advance of the circuit-breaker, through which an advance current may be sent without disturbing the circuit-breaker which remains on guard until the train has passed out of danger, when, by the mechanical housing of the advance signal, the verifying-circuits are broken at that post and the signal restored to its normal position, at "danger," by its retracting-spring. Each shaft D terminates in one of the outer compartments of the signal-box at the end opposite to its counter-weight, and each outer end is provided with a double cam, N O.

At the end of each shaft D is rigidly attached a locking-arm, P, which is provided with upturned end $p$.

Figure 5:
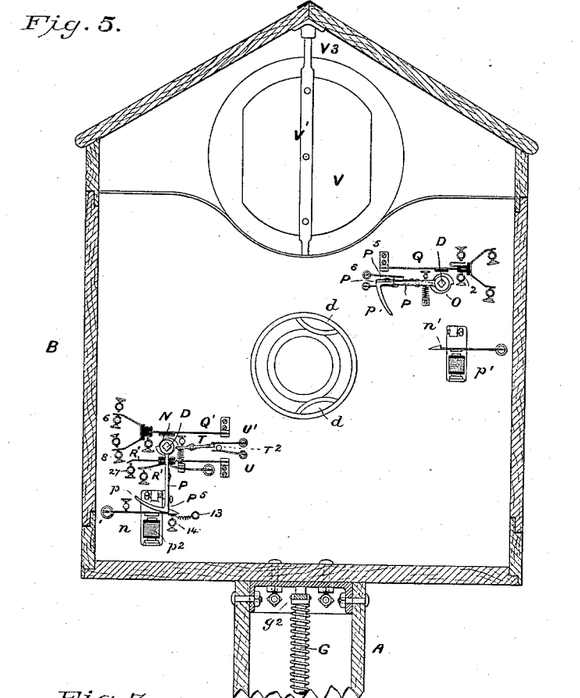
Fig. 5 is a vertical sectional elevation on the line 5 5 of Fig. 6, and it shows the mechanism of the electric locking and switching devices controlling the operation of one set of signals.

In order to avoid failure of the upturned portion $p$ to pass over the catch of the spring-armature $n$ by reason of the occasional very short duration of the signal-releasing impulse, I attach to each lever P a safety device—shown in Fig. 5, and consisting of a spring, $P^5$, attached to the outer side and extending down to the extremity of the aforesaid lever P. It is also provided with an upturned lower portion, $P^6$, fitting into the upturned end $p$, which, when extended, forms a continuation thereof. When the spring-catch $n$ is drawn downward by the magnet, the spring $P^5$ is released and moves forward instantly, so as to cover the catch $n^3$ and prevent its rising, and thereby relocking the lever P in case the electrical impulse sent from an adjacent station is of insufficient duration to allow the force of gravity to overcome the inertia of the signal to be dropped.

At the end of each shaft D is rigidly attached a locking-arm, P, which is provided with upturned outer end, $p$. When all the advance signals are housed, their locking-arms are held by spring-catches $n$, which form armatures for electro-magnets $p'$, that are suitably fixed to the walls of the outer compartments. The current from the line 1 enters through the switch Q, and passes thence through contact 2 and wire 3, contact 4, wire 5, contact 6, switch 7, contact 8, and wire 9, to electro-magnet $p^2$, thence through wire 10, switch Q', contact 11, and wire 12, to ground.

A current from an approaching train sent through the circuit above described will, by energizing the magnet $p^2$, draw down the spring-catch $n$ and liberate the arm P and signal W A, the outward or display movement of which raises the switch Q' by turning the cam N, and thereby breaks the ground-connection of the magnet $p^2$ through the wire 10, switch Q, contact 11, and wire 12.

In order to maintain a ground-connection for the magnet $p^2$ until the desired movement of the signal has taken place and the current that caused it has ceased, an auxiliary ground-line is completed through wire 13, spring-catch $n$, contact 14, wire 15, and wire 12, to ground. This latter circuit is mechanically broken by the resiliency of the spring-catch $n$, which rises as soon as the current ceases to flow in its magnet $p^2$, and the upturned end $p$ of the locking-arm is removed therefrom by the display movement of the signal.

The switches Q Q' are formed of two portions, each insulated from the other. The elevation of the switch Q', besides removing one portion of it from the contact 11 and breaking the local ground-connection, also lifts its outer or second part from the contacts 16 17, (which form a part of the circuit of the opposing system of signals,) and holds it against the contacts 4 18, which complete the circuit through the wire 19, contact 20, switch 21, contact 22, wires 23 24, contact 25, and switch 26, to line and forward to the post next in advance.

Figure 15:
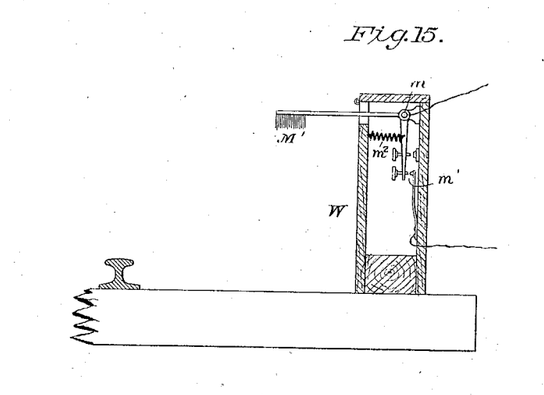
Fig. 15 is a sectional elevation of the electrical contact device, showing the details of construction and arrangement.
Figure 16:
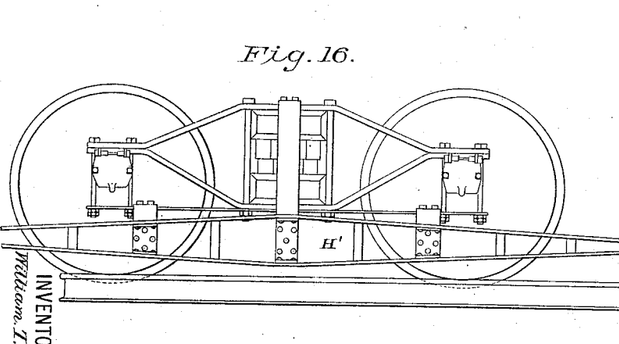
Fig. 16 is a view in elevation of a truck provided with the shuttle-cam used for compressing the spring in the power-receiver.
Figure 17:
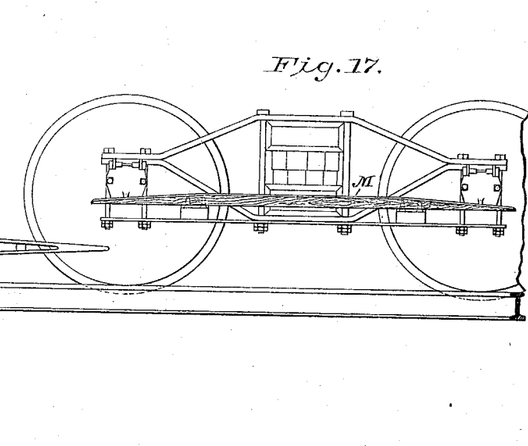
Fig. 17 is a view in elevation of a truck provided with an electrical contact-slide, through which the current is conveyed from the train to the signaling-station.

R R' represent two spring-switches for operating the verifying-signal. When displaced by the rotation of cam N, they rest upon contacts 27 28, respectively. When in that position, the switch R completes the verifying-signal-setting circuit for its own post through the contact 27, wires 29 30, magnet $v^5$, and wire 31, to ground. The foregoing circuit does not include a source of electricity; but from the switch R the line-wire $32^A$ leads forward to the post next in advance, and what the displaying of the advance signal does is, first, to make the connection above described, through which a current is sent from the local battery of the forward post as soon as the advance signal on said forward post is displayed; and, second, when housed, it breaks at its own post the circuits of the verifying-signal, which in returning to its normal position reunites the main line, allowing a current to enter that post to release and house its rear signal. When the switch R' is depressed, it rests upon contact 28 and completes a circuit through wires 33 34 to the local battery S, from whence the current passes through wires 34 33, contact 28, switch R', wire 35, and line $32^R$, back to the post next in the rear, where it passes through a switch, R, and connections to the magnet $v^5$, and thereby imparts a quarter-turn to the verifying-signal and changes it from "danger" to "safety." When the verifying-signal is at "safety," the circuit-breaker, which consists of a double cam, $V^7$, attached to the shaft V', is turned so as to force the switches 26 $26^a$ away from their contacts 25 $25^a$, thus severing the main line in both directions. When the rear signals are mechanically set by the apparatus previously described, the cam O raises the switch Q from the contact 36, and at the same time breaks the forward advance circuit by raising the switch 21 from the contacts 20 22. As said signal reaches its horizontal position, the outer end of the lever P engages the spring-catch $n'$, and is thereby securely held until a rear current is sent from a train at the post next in advance; said current, passing through wire 37, switch Q, contact 38, wire 39, electro-magnet $p'$, wire 40, contact 41, and wire 42, to ground, operates, by energizing said magnet, to draw down the spring-catch armature $n'$, and thereby release the locking arm P and allow the signal to swing downward and inward until it reaches its normal position within the box B, when the switch Q descends, and with it the switch 21, restoring the advance circuit. At or near each post are located two contact-brushes, M' and $M^2$, each of which is pivoted at $m$ within a suitable box, W, and is normally held against the line-contact $m'$ by a spring, $m^2$, as seen in Fig. 15. Both brushes are located in such position with respect to the track that they will be in the path of the contact-bar M, carried by the train, and forming one terminal of a source of electricity also carried thereby, the other pole being grounded through the wheels and rails. One of the said brushes is placed in front and the other in the rear of the circuit-breaker, as shown, so that current is sent first through contact-brush M', for the purpose of dropping the rear signal at the post next in the rear, and then, the mechanical devices having been operated, current is sent forward through the second contact-brush, M², to drop the advance signal two posts ahead. As the train passes and makes contact with the first of said brushes, it breaks the line and sends through said brush a current which passes rearward to release its rear signal. As the train leaves the post and makes contact with the other brush, it tips it away from its line-contact m', which prevents the current going to ground through the post immediately in rear of the brush, and thus secures the sending of current forward and the setting of the desired signal. If all is in good order and uninterrupted, on reaching the next post the verifying-signal will have changed from "danger" to "safety," notifying the approaching train that the advance signal intended to be set from the post last passed was so set and everything is clear for at least one entire block ahead. If a train approaching from the opposite direction has entered the block ahead, the verifying-signal cannot be moved, and by thus indicating "danger" will give notice to the train to stop. As train No. 2 cannot receive verification of its advance signal because of the presence of train No. 1, it will be brought to a standstill before entering the block intervening between the said trains.

The night-signals read as follows: A green light means train in front, receding; a red light, train in front, approaching; white light in advance of moving train indicates two things—viz., advance signals set and verification-signal turned to "safety" on the post being passed. An additional circuit conducting the current to the electric lighting device passes through each post, and is arranged so as to become operative when either one of the cams N or O is rotated.

T T' represent pivoted switching-levers that are located so as to bear upon the cams N O. They are each provided with retracting-springs t, and also with a block of insulating material, t', at their outer ends.

T² are fixed contacts forming the terminals of the local electric lighting circuits of each post, and U U' U² U³ are spring-switches adapted to rest upon the contacts T². The blocks t' are of such thickness that when the lever T is moved from one position to the other the spring-switch that was thereby held away from its contact T² will be allowed to rest thereon before the contact of the opposite switch is broken, thus avoiding sparks and the danger to the apparatus resulting therefrom. The current enters by wire 43, thence through eastern switch U' and wire 44 to switch U², thence by wire 45 to opposite switch U², thence by wire 46 to western switch U', thus including all the signals on each post. The wire 47 leads to the next post, and although I have described the current as entering from one direction, it may be sent from the other with equally good results. The displaying of the advance signal E A will move the cam N away from the inner end of the pivoted switch T, which will then be moved toward its retracting-spring t, the effect of which will be, first, to allow the spring-switch U to rest against the contact T², and, second, to remove the switch U' from said contact, and thereby to divert the lighting-current from said contact T², through the switch U, wires 48 49 50, lamp L, wire 51, and contact 52, to line 47. The displaying of either of the signals will, by moving the switches connected therewith, produce effects similar to those above noted.

Having thus described my invention, what I claim as new, and desire to secure by Letters Patent, is—

1. An electric railway signaling system comprising a double set of advance and rear signals united and controlled by a single series of normally-independent circuits extending from post to post along the entire line, substantially as set forth.

2. An electric railway signaling system comprising a double set of advance and rear signals united and controlled by a single series of normally-independent circuits extending from post to post along the entire line, and a movable two-part switch located in proximity to each of the signals, and mechanical and electrical connections between said switches and signals, whereby either advance signal when displayed will complete its forward circuit through the switch of its rear signal, and when housed and the rear signal displayed said switch will be moved thereby, so as to sever the advance circuit and prevent the setting of advance signals by a following train, substantially as described.

3. A system of electric railway-signals comprising a series of normally-independent circuits, each circuit being provided at either end with a set of signals and electric controlling mechanism, each set including a normally-grounded switch operated by a visual signal adapted to be displayed by mechanically-stored power released electrically from a distant point, and then mechanically housed, and a verifying-signal controlled electrically by normally-open circuits passing through the advance signals of both systems, which circuits are closed by the display movement of the advance signals at that post, whereby a current may be sent rearward to the next verifying-signal to move the same from "danger" to "safety," thereby giving notice of the displaying of the distant advance signal last set, substantially as described.

4. A system of electric railway-signals comprising a series of normally-independent circuits, each provided at either end with a set of signals and electric controlling mechanism, each set including a normally-grounded switch operated by a visual signal adapted to be displayed by mechanically-stored power released electrically from a distant point and then mechanically housed, and a verifying-signal controlled electrically by two normally-open circuits passing through the advance signals of both systems, one of which extends rearward and includes a source of electricity, from which a current is sent to the next post to move its verifying-signal from "danger" to "safety," the other circuit being locally grounded, but unprovided with current, and extending forward to the next post, where, on the displaying of an advance signal at said advance post, it is connected with a source of electricity, from which current passes rearward to the intermediate post, and by actuating the electro-magnetic apparatus thereof changes the verifying-signal from "danger" to "safety," as described.

5. An electric railway signaling system comprising a series of normally-independent circuits, each of which is connected at one end with electric signal-controlling mechanism for advance and rear signals, and at its other end with the electric signal-controlling mechanism of rear and advance signals, a pair of switches normally grounded and located in proximity to the advance signals, and a pair of switches normally out of circuit and located in proximity to the said rear signals, and mechanical connections between said signals and the switches, whereby the advance switches are automatically shifted, so as to span the signal-operating mechanism and unite the contiguous circuits through the switches of said rear signals upon the displaying of an advance signal, as set forth.

6. In an automatic electric railway signaling system, a series of signaling-stations extending along a line of railway, each provided with two normally-grounded movable contact-switches, through one of which the current enters and through the other of which it leaves, according to the direction of the approaching train, and contact devices, substantially as described, for transmitting a current from a train at one of the posts to one or more thereof in advance in either direction, and to ground successively through a predetermined set of movable contacts and a signal-controlling electro-magnet located at each of said stations, said ground-connections being successively broken from either direction (when the line is clear) by the successive displaying of the set of signals released therethrough, substantially as described.

7. In an automatic signaling system, the combination, with electric signal locking and controlling mechanism, of an electro-magnet for releasing the same, a normally-grounded circuit including said magnet, and a movable switch in proximity to said mechanism, of an auxiliary or by-pass circuit adapted to complete the ground-connection of said magnet during the display movement of the signal and prior to the severance of the normal ground-line, thereby interposing a temporary ground at that point for that impulse and preventing any portion thereof passing beyond, substantially as described.

8. In an automatic electric railway signaling system, a pivoted two-part switch consisting of a stem or arm forming part of one circuit and a pair of arms attached to the extremity thereof, but insulated therefrom and normally included in a different circuit, and mechanical means operated by the movements of the signal for changing the positions of said switch, and thereby breaking one of its circuits and completing the other, substantially as set forth.

9. In an electric railway signaling system, an electrically-operated supplementary or verifying signal normally indicating "danger," and included in a circuit passing through the advance signals of the moving train, the safety-circuit being arranged to be made and broken by the mechanical movements of said advance signals, substantially as set forth.

10. In an electric railway signaling system, an electrically-operated supplementary verifying-signal normally indicating "danger," in combination with an advance signal or signals and electrical switches operated by the latter, a portion of said switches being located in the circuit of the verifying-signal, whereby the safety-circuit of said verifying-signal is made and broken by the mechanical movements of other signals forming part of the same system, but located at a distant point in advance, substantially as set forth.

11. In an electric railway signaling system, an electrically-operated supplementary or verification signal included in a circuit passing through and controlled by the movements of two advance signals located at different points in advance of the moving train, substantially as set forth.

12. In an electric railway signaling system, an electrically-operated verifying-signal having circuits adapted to be made and broken by the mechanical movements of other signals, one of which is a distant advance signal forming part of the same system, and a retracting-spring or equivalent for restoring said signal to its normal or "danger" position when said mechanical movements terminate by the housing of the circuit-controlling signals, as hereinbefore described.

13. The combination of a vertically-pivoted signal, an armature-carrying lever, and means for communicating rotary motion from said lever to the signal, an electro-magnet located so as to control the movements of said lever, a ground-line, and a pair of pivoted switches forming parts of a normally-open circuit including a source of electricity and mechanism actuated by the displaying of either advance signal for moving the switch and closing said circuit, whereby the magnet is energized and the signal turned, as set forth.

14. The combination of the signal V, provided with toothed sector $v^4$, pivoted lever $V^6$, provided with suitable armature, and an electro-magnet, $v^5$, the ground-wire 31, wires 30 and 29, contact 27, switch R, and cam N, with the wire 32, wire 35, switch R', contact 28, wire 34, battery S, and cam N of the next adjacent post, substantially as described.

15. In an automatic electric railway signaling system comprising advance and rear signals operated by moving trains, a supplementary or verification signal, and means consisting of switches operated by the movement of the said verification-signal, substantially as described, for breaking the main or signaling circuit at that point whenever said verifying-signal is moved from "danger" to "safety," substantially as described.

16. In an automatic electrical railway signaling system comprising signals operated by moving trains, a supplementary or verification signal and an automatically-operated circuit-breaking device operated by said verifying-signal breaking the main or signaling circuit at that point whenever said verifying-signal is moved from "danger" to "safety," substantially as described.

17. In an automatic electric railway signaling system, a pair of line contact-brushes included in the main circuit and located one on each side of each signaling-station, a circuit-breaker operated by each contact-brush, and connections, as described, whereby at each contact with a moving train the normal circuit will be momentarily broken and a current imparted from a source of electricity on said moving train will traverse the longer end of said normal circuit, thereby energizing the electro-magnetic signal-operating devices at a distant station, as set forth.

18. In an automatic electric railway signaling system, the combination, with a pair of line contact-brushes located one on each side of each signaling-station, and a circuit-breaking device between said brushes operated by the movements of the verifying-signal, of a contact-bar mounted upon and carried by the train being signaled, a source of electricity, also carried by the train, and connections for sending a current of electricity through said bar, the contact-brushes, and line, substantially as set forth.

19. In an automatic electric railway signaling system, one or more sets of day-signals located at each post, and means, substantially as described, for displaying and housing the same, an electric lighting device located at about the center of each system, and a supplementary system of night-signals, consisting of colored semaphores actuated by the movements of the day-signals, so as to cover or expose the light as the day-signals are displayed and housed, substantially as described.

20. In an automatic electric railway signaling system, a double set of advance and rear signals and means for housing the same, in combination with an electric lighting device and a supplementary set of colored signals for night use, and mechanical connections between said day and night signals, whereby the latter are displayed in front of or to the rear of the fixed light, so as to change its color in a direction corresponding to the nature of the signal displayed, substantially as described.

21. In a system of automatic electric railway-signals comprising two or more signals to each post, an electric lighting device located at substantially the central point in each system, and a series of switches, one to each signal, and mechanical means for operating said switches, whereby by the displaying of any of said signals a normally-closed circuit carrying the electric lighting-current will be opened and said current diverted through the electric lighting device, substantially as described.

22. The combination, with the lamp L, terminals $T^2$, and connecting-wires, of the spring-switches U U' $U^2$ $U^3$, mounted in pairs, one on each side of a terminal, $T^2$, and adapted to make contact therewith, pivoted levers T, each having a block of insulating material, $t'$, at its outer end and provided with a suitable retracting-spring, and located so as to bear upon the cams N O, to normally hold one set of switches away from the terminals $T^2$, and when said cams are rotated to allow the set of switches previously out of contact to make contact with the terminals $T^2$ before the opposing set are removed therefrom, whereby sparking and burning of the apparatus are prevented, one circuit being made before the other is severed.

23. In an automatic railway signaling system, the combination of a pair of levers having crank-arms projecting therefrom, a rod suspended between said crank-arms, a coiled spring mounted on said rod and confined between two fixed points thereon, and means carried by a moving train for raising one of said levers and depressing the other, both movements uniting to continuously compress the spring.

24. In a system of automatic railway-signals, a power-receiving device consisting of the combination of laterally-projecting angle-levers $h$ $h'$, crank-arms $h^2$ $h^3$, depending therefrom, a rod, $h^4$, pivoted to the extremities of and uniting said crank-arms, and a spring, J, carried upon said rod and confined within a trough or box, $h^5$, provided with supporting lugs or trunnions $h^6$, and perforated at each end to allow free passage of the rod $h^4$ and keys J', carried thereon, and a pair of washers, $j$, mounted upon said rod within said box, between which the spring is confined and compressed by the movement of the levers, substantially as shown and described.

25. In a system of automatic electric railway-signals, the semaphores W A, W R, suitably mounted on shafts, and provided with cams N O, respectively, and with the locking-levers P, having upturned extremities $p$, in combination with spring-catches $n\ n'$, electro-magnets $p'\ p^2$, switching-levers Q Q', and electrical connections, substantially as set forth.

26. The combination, with the signals W A, W R, cams N O, and locking-levers P $p$, of the catches $n\ n'$, electro-magnets $p'\ p^2$, switches Q and 7, wires 3 5 9 10, switch Q', and wire 12, as described.

27. The combination, with the signals W A, W R, cams N O, and locking-levers P $p$, of the catches $n\ n'$, electro-magnets $p'\ p^2$, switches Q and 7, and wires 3, 5, 9, 13, 15, and 12, as described.

28. The combination of semaphores W A, W R and suitable supporting-shafts, the slotted loosely-mounted crank-arms $d'$, and rigidly-mounted crank-arms $d^3$, with the yoke F, provided with pins $f$, and a downwardly-extending rod, G, substantially as set forth.

29. The combination, with semaphores W A and W R and supporting-shafts, slotted crank-arms loosely mounted thereon, and crank-arms rigidly secured thereto, of the yoke F, provided with pins engaging the slots of the crank-arms, a downwardly-extending draft-rod, G, and a retracting-spring, $g^4$.

30. The combination of semaphore-arms, suitable supporting and controlling mechanism, a draft-rod leading to a source of power, and an air-cushion cylinder and adjusting devices, whereby quick movements of the draft-rod are prevented, substantially as described.

31. The combination of the semaphore-arms, suitable supporting and controlling mechanism, a draft-rod leading to a source of power, and an air-cushion cylinder having a tubular piston-rod formed with communicating apertures above and below the piston, and a rod and adjusting devices within said piston-rod, whereby the area of one of said apertures can be increased or diminished to regulate the resistance of the piston, substantially as shown and described.

32. The combination, with draft-rods G, connecting-levers $k'$, provided with catches $k^3$, and adjustable stops $K^2$, of the arms $g\ g$, provided with spring-catches $J^3$, and the shaft $J^2$.

33. The combination, with draft-rods G, connecting-levers $k'$, provided with catches $k^3$ and studs $k^4$, the shaft $J^2$, upon which the inner ends of said levers are loosely supported, and adjustable stops $K^2$, of the arms $g\ g$, provided with spring-catches $J^3$, adapted to engage the stop $k^3$, and having laterally-extending trip-pins $i$ and a pair of trip-levers, K', pivotally supported on the studs $k^4$, and adapted to engage the stops $k^2$ on the descent of the draft-rods, and to retract and release the catches $J^3$.

In testimony whereof I affix my signature in presence of two witnesses.

WM. T. WATERS.

Witnesses:
N. L. COLLAMER,
FRANKLAND JANNUS.